(12) United States Patent
Kolpasky

(10) Patent No.: US 10,309,291 B2
(45) Date of Patent: Jun. 4, 2019

(54) FLAPPER DOOR AIR GUIDE

(71) Applicant: DENSO International America, Inc., Southfield, MI (US)

(72) Inventor: Thomas Kolpasky, Madison Heights, MI (US)

(73) Assignee: DENSO International America, Inc., Southfield, MI (US)

( * ) Notice: Subject to any disclaimer, the term of this patent is extended or adjusted under 35 U.S.C. 154(b) by 36 days.

(21) Appl. No.: 15/712,896

(22) Filed: Sep. 22, 2017

(65) Prior Publication Data

US 2019/0093544 A1 Mar. 28, 2019

(51) Int. Cl.
*F01P 5/06* (2006.01)
*F01P 7/10* (2006.01)
*F01P 11/10* (2006.01)
*B60K 11/02* (2006.01)

(52) U.S. Cl.
CPC ............... *F01P 7/10* (2013.01); *F01P 5/06* (2013.01); *F01P 11/10* (2013.01); *B60K 11/02* (2013.01); *F01P 2070/06* (2013.01)

(58) Field of Classification Search
CPC ...... F01P 7/10; F01P 5/06; F01P 11/10; F01P 2070/06; B60K 11/02

USPC ...................................................... 123/41.04
See application file for complete search history.

(56) References Cited

U.S. PATENT DOCUMENTS

| 6,106,228 | A | 8/2000 | Bartlett | |
|---|---|---|---|---|
| 7,014,144 | B2 | 3/2006 | Hein et al. | |
| 8,474,557 | B2* | 7/2013 | Wolf | B60T 5/00 180/68.1 |
| 2007/0119395 | A1* | 5/2007 | Nagano | F01P 11/10 123/41.65 |
| 2012/0071075 | A1* | 3/2012 | Wolf | B60T 5/00 454/162 |

* cited by examiner

*Primary Examiner* — Lindsay M Low
*Assistant Examiner* — Yi-Kai Wang
(74) *Attorney, Agent, or Firm* — Harness, Dickey & Pierce, P.L.C.

(57) ABSTRACT

The present teachings provide for a radiator fan assembly including a fan, a shroud, a flapper door opening, and a flapper door. The shroud defines a fan opening aligned with the fan through which airflow from the fan passes. The flapper door opening is defined by the shroud. The flapper door is pivotally mounted at the flapper door opening. The flapper door includes a main body and an air guide extending from the main body.

19 Claims, 3 Drawing Sheets

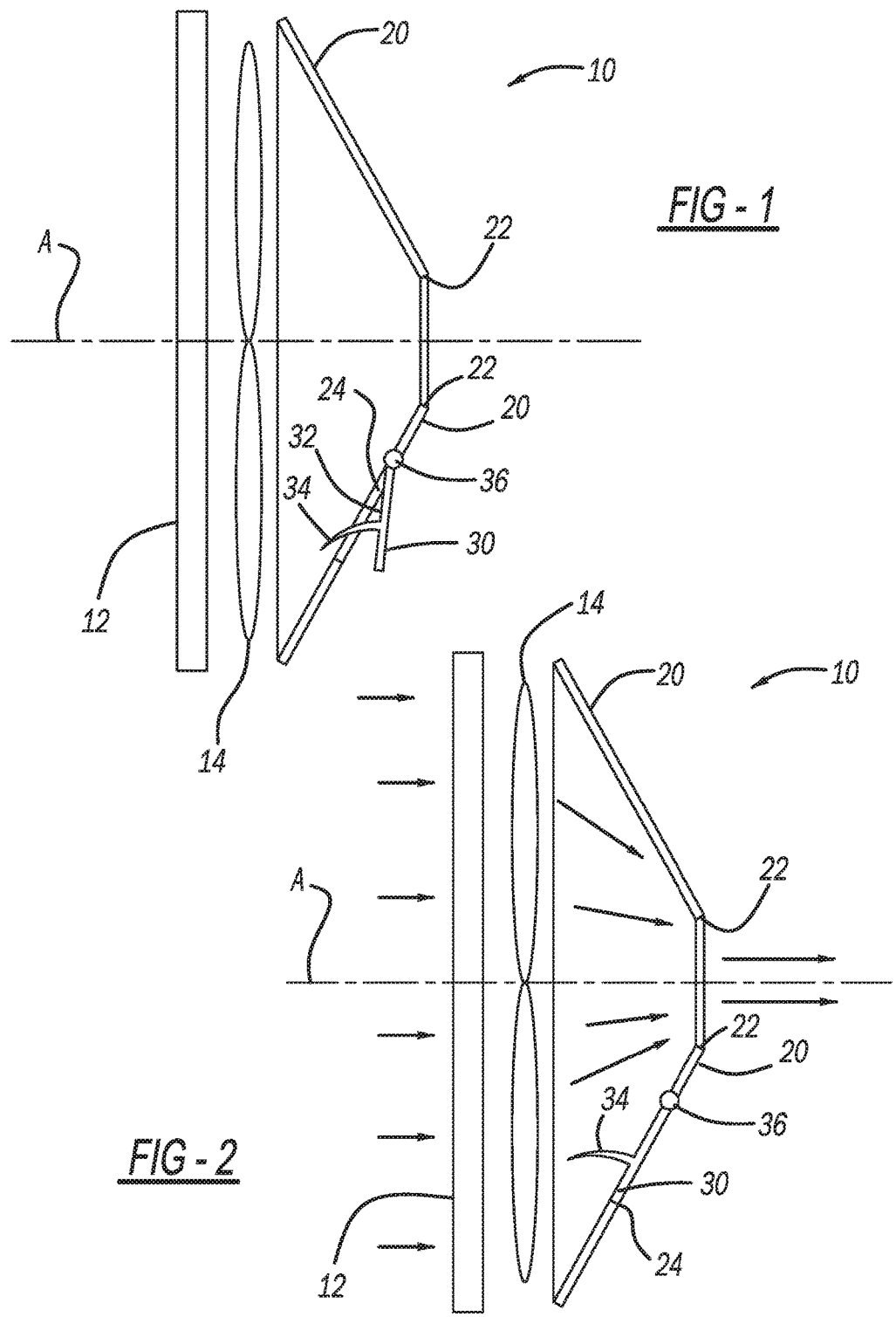

FLAPPER DOOR AIR GUIDE

FIELD

The present disclosure relates to flapper door for a cooling fan shroud, such as a radiator cooling fan shroud.

BACKGROUND

This section provides background information related to the present disclosure, which is not necessarily prior art.

Flapper doors are used on cooling fan shrouds to open the shroud, thereby improving airflow through a radiator during high speed conditions and when the fan is not in use. Existing hard plastic flapper doors are suitable for their intended use, but are subject to improvement. For example, existing flapper doors often produce undesirable levels of noise. The present teachings advantageously provide flapper doors that generate less noise as compared to current flapper doors, as explained herein. The present teachings provide for numerous additional advantages, as explained herein and as one skilled in the art will recognize.

SUMMARY

This section provides a general summary of the disclosure, and is not a comprehensive disclosure of its full scope or all of its features.

The present teachings provide for a radiator fan assembly including a fan, a shroud, a flapper door opening, and a flapper door. The shroud defines a fan opening aligned with the fan through which airflow from the fan passes. The flapper door opening is defined by the shroud. The flapper door is pivotally mounted at the flapper door opening. The flapper door includes a main body and an air guide extending from the main body.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

FIG. 1 illustrates a radiator fan assembly including a flapper door in accordance with the present teachings, the flapper door is in a partially open position;

FIG. 2 illustrates the radiator fan assembly of FIG. 1 with the flapper door closed;

Corresponding reference numerals indicate corresponding parts throughout the several views of the drawings.

DETAILED DESCRIPTION

Example embodiments will now be described more fully with reference to the accompanying drawings.

Figure 3:
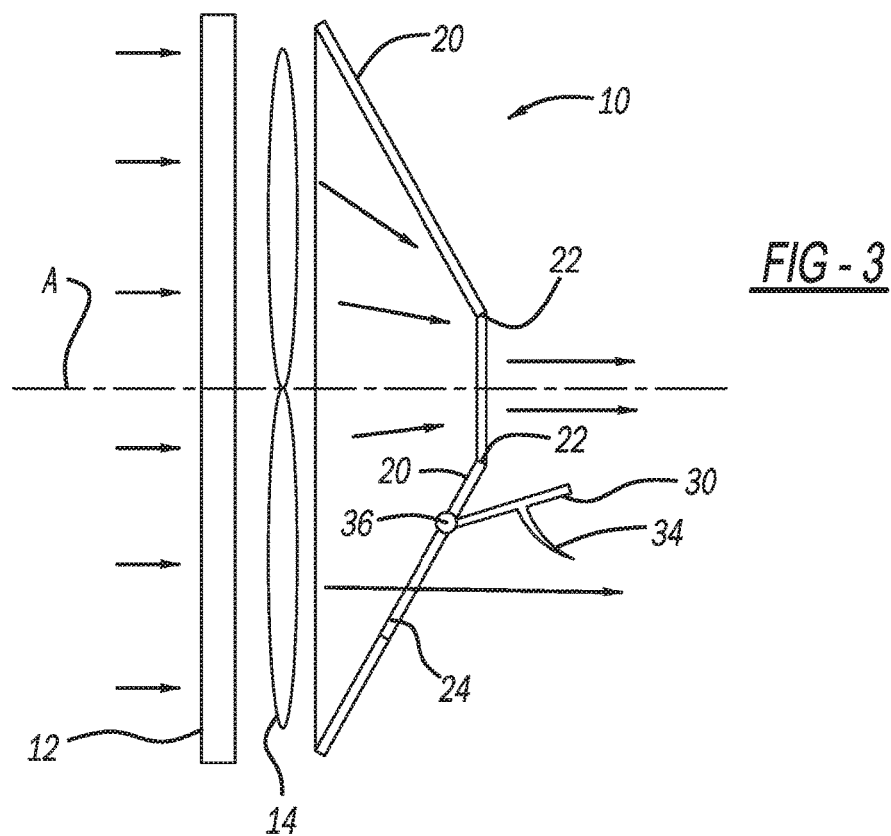
FIG. 3 illustrates the radiator fan assembly of FIG. 1 with the flapper door fully open.

FIGS. 1-3 illustrate an exemplary radiator fan assembly in accordance with the present teachings at reference numeral 10. The radiator fan assembly 10 can be configured for use in any suitable cooling and heating application. For example, the radiator fan assembly 10 can be used to cool any suitable engine, such as any suitable vehicle engine. The assembly 10 can also be used with a heating, ventilation, and air conditioning (HVAC) building system, and to cool various electronics. With respect to vehicles, the radiator fan assembly 10 can be used to cool an engine of any suitable vehicle, such as any suitable passenger vehicle, mass transit vehicle, military vehicle, recreational vehicle, construction vehicle or equipment, watercraft, aircraft, etc.

The assembly 10 generally includes a radiator 12 and a fan 14 proximate thereto. The fan 14 is configured such that activation of the fan 14 draws airflow to and through the radiator 12, as well as to and through the fan 14. At least a portion of the fan 14 is covered by a shroud 20. The shroud 20 defines a fan opening 22 on a side of the fan 14 that is opposite to the radiator 12. In the example illustrated, a longitudinal axis A extending through an axial center of the fan 14, about which the fan 14 rotates, also extends through, or proximate to, a center of the fan opening 22.

The shroud 20 defines an opening 24, which extends through the shroud 20 to permit airflow through the shroud 20 when the opening 24 is open. The opening 24 is at times referred to herein as a flapper door opening. A flapper door 30 is mounted at the flapper door opening. The flapper door 30 is mounted in any suitable manner, such as pivotally mounted, in order to open and close the opening 24. For example, the flapper door 30 can be mounted to the shroud 20 at attachment point/pivot point 36 located at or near the opening 24. Although a single flapper door opening 24 and a single flapper door 30 are illustrated, the shroud 20 can include any suitable number of flapper door openings 24 and associated flapper doors 30.

Figure 4:
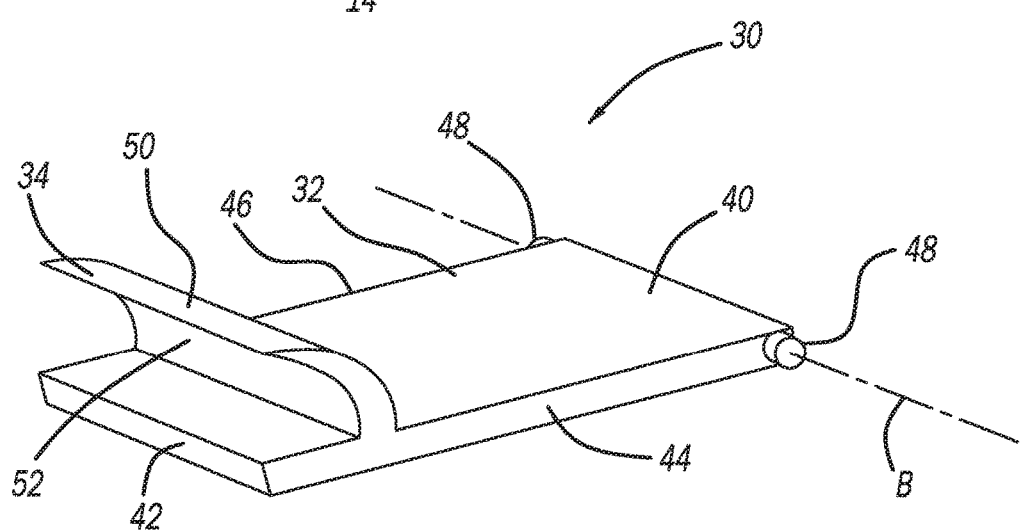
FIG. 4 illustrates an exemplary flapper door in accordance with the present teachings.
Figure 5:
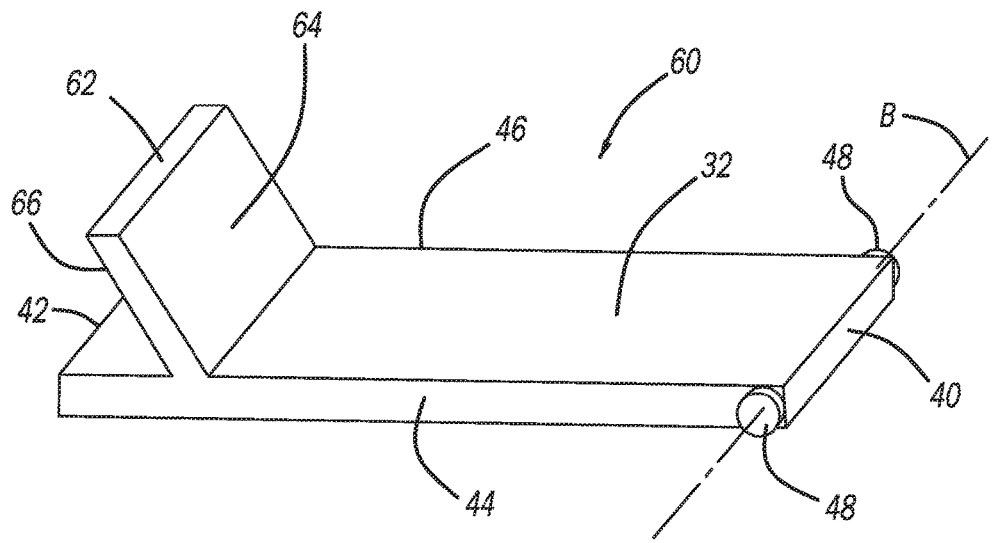
FIG. 5 illustrates another exemplary flapper door in accordance with the present teachings.

With continued reference to FIGS. 1-3, and additional reference to FIGS. 4-6, further details of the flapper door 30 will now be described. The flapper door 30 generally includes a main body 32 and an air guide 34 extending from the main body 32. The main body 32 includes a proximal end 40 and a distal end 42, which is opposite to the proximal end 40. The main body 32 further includes a first side surface 44 and a second side surface 46, which is opposite to the first side surface 44. At the proximal end 40 can be any suitable coupling member 48 for mounting the flapper door 30 at the flapper door opening 24. In the examples illustrated, the coupling member 48 includes first and second coupling members 48 in the form of knobs extending from the first side surface 44 and the second side surface 46 respectively. Pivot axis B of the flapper door 30 extends across the main body 32 from the first side surface 44 to the second side surface 46 through the coupling members 48.

The air guide 34 can have any suitable shape, size, and configuration to facilitate movement of the flapper door 30 in response to airflow generated by the fan 14 and resulting from ram air conditions, as discussed herein. In the example of FIG. 4, the air guide 34 includes a curved outer surface 50, which is opposite to a curved inner surface 52. FIG. 5 illustrates another flapper door according to the present teachings at reference number 60. The flapper door 60 is generally the same as the flapper door 30, and similar features are illustrated with like reference numbers. Unlike the air guide 34 of the flapper door 30, the flapper door 60 includes an air guide 62 having a generally planar outer surface, which is opposite to a generally planar inner surface 66.

Figure 6:
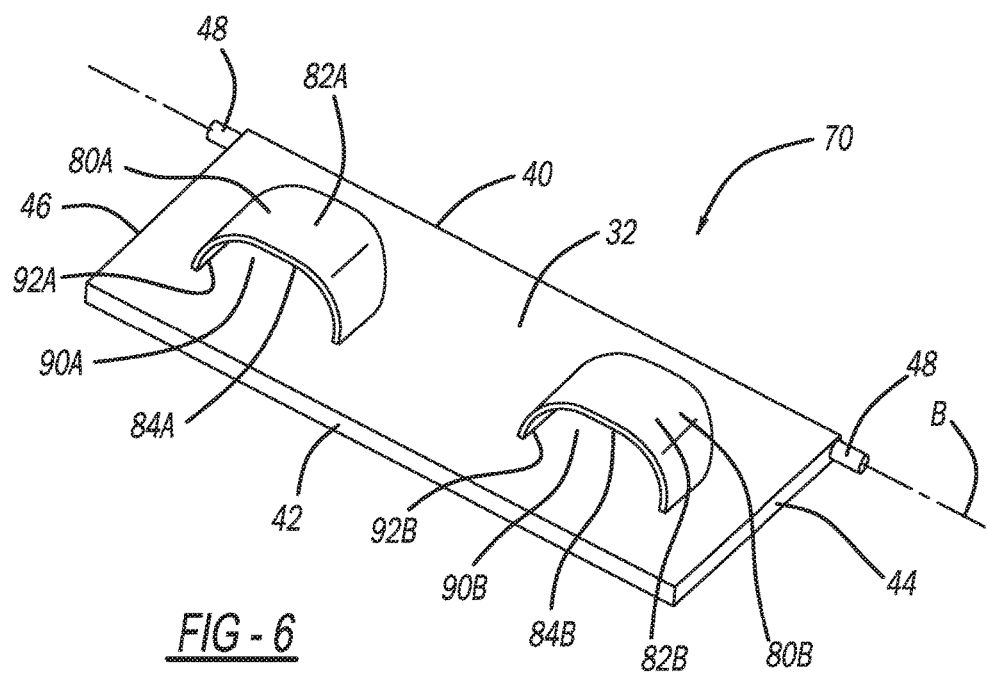
FIG. 6 illustrates an additional flapper door in accordance with the present teachings.

FIG. 6 illustrates another flapper door according to the present teachings at reference numeral 70. Features of the flapper door 70 that are similar to the flapper door 30 are designated in FIG. 6 with common reference numerals. Unlike the flapper doors 30 and 60, the flapper door 70 includes a first air guide 80A and a second air guide 80B, which is spaced apart from the first air guide 80A.

The first air guide 80A includes an outer surface 82A, which is opposite to an inner surface 84A. Each one of the outer surface 82A and the inner surface 84A is curved. The first air guide 80A is mounted to, or integral with, main body 32 so as to define a first cavity 90A between the inner surface 84A and the main body 32. The outer and inner surfaces 82A and 84A are positioned and shaped such that the first cavity 90A defines a first opening 92A. Other than the first opening 92A, the first air guide 80A is closed. In some applications, the first air guide 80A can include one or more slots or other openings defined by the outer surface 82A and the inner surface 84A to permit airflow to pass therethrough. The first opening 92A is at an end of the first air guide 80A closest to (and facing) the distal end 42. The first opening 92A is suitable to capture air flow for rotation of the flapper door 70, as explained herein.

The second air guide 80B is the same as, or substantially similar to, the first air guide 80A. Features of the second air guide 80B that are in common with the first air guide 80A are designated in FIG. 6 with the same references numerals, but include the letter "B." Thus, the description of the first air guide 80A is also sufficient to describe the second air guide 80B.

With renewed reference to FIGS. 1-3, operation of the flapper door 30 will now be described. Although FIGS. 1-3 illustrate the assembly 10 as including the flapper door 30, the flapper doors 60 and 70 can be similarly mounted at the attachment/pivot point 36, and will move in a manner similar to movement of the flapper door 30 described below.

As illustrated in FIG. 1, the flapper door 30 is mounted and configured such that when no airflow is passing through the radiator 12 (or generated by the fan 14) the flapper door 30 freely hangs from the attachment/pivot point 36. When freely hanging, the flapper door 30 is positioned such that the main body 32 is on a side of the shroud 20 that is opposite to the fan 14, and the air guide 34 extends into and through the opening 24 of the shroud 20 towards the fan 14 and the radiator 12. The air guide 34 is curved downward, and away from the longitudinal axis A.

The flapper doors 60 and 70 are mounted and arranged in a similar manner when no airflow (or a minimal amount of airflow) is flowing through the radiator 12 and the fan 14 is off. Specifically, the main body 32 of each of the flapper doors 60 and 70 is on a side of the shroud 20 opposite to the fan 14, and the air guides 62, 80A, and 80B extend to and through the opening 24 defined by the shroud 20. With each one of the flapper doors 30, 60, and 70, when little or no airflow is flowing through the radiator 12 and the fan 14 is off, the main bodies 32 thereof are generally spaced apart from the opening 24 and portions of the shroud 20 defining the opening 24 in order to advantageously prevent the flapper doors 30, 60, and 70 from banging against the shroud 20, and thereby reducing the possibility of an undesirable rattling noise being generated.

With reference to FIG. 2, activation of the fan 14 draws air into and through the radiator 12, and generates airflow through the shroud 20. Airflow from the fan 14 contacts the air guide 34, which causes the flapper door 30 to rotate towards the fan 14, and draws the main body 32 to the opening 24 in order to close the opening 24. Specifically, airflow from the fan 14 will contact the curved inner surface 52 of the flapper door 30, thereby causing the flapper door 30 to rotate into the opening 24. Similarly, when the flapper door 60 is installed with the assembly 10, airflow from the fan 14 will contact the inner surface 66 of the air guide 62, thereby causing the flapper door 60 to rotate into the opening 24 and close the opening 24. When the assembly 10 includes the flapper door 70, airflow from the fan 14 will enter the first and second cavities 90A and 90B of the first and second air guides 80A and 80B respectively, thereby causing the flapper door 70 to rotate such that the main body 32 thereof closes the opening 24.

FIG. 3 illustrates airflow passing through the radiator 12 and the fan 14 as a result of air being forced into and through the radiator 12, and through the fan 14 due to the assembly 10 being in motion, such as due to a vehicle including the assembly 10 travelling forward. The fan 14 is typically deactivated under these conditions, but may be active as well. The ram air airflow is typically stronger than an airflow generated by the fan 14 alone (as illustrated in FIG. 2), and thus pushes the flapper door 30 (or either one of the flapper doors 60 and 70) outward and away from the radiator 12 and the fan 14 such that the main body 32 is moved further from the opening 24 as compared to the no airflow condition of FIG. 1, thereby further opening the opening 24 and improving airflow through the opening 24 and the assembly 10 generally.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A radiator fan assembly comprising:
   a fan;
   a shroud defining a fan opening aligned with the fan through which airflow from the fan passes;
   a flapper door opening defined by the shroud; and
   a flapper door pivotally mounted at the flapper door opening, the flapper door including a main body and an air guide extending from the main body;
   wherein the flapper door is mounted at the flapper door opening such that the air guide of the flapper door extends through the flapper door opening when there is no airflow through the fan opening.

2. The radiator fan assembly of claim 1, wherein the flapper door is mounted at the flapper door opening such that, when there is no airflow through the fan opening, the air guide of the flapper door extends through the flapper door opening and the main body of the of the flapper door is outside of the shroud.

3. The radiator fan assembly of claim 1, wherein the flapper door is mounted at the flapper door opening such that when the fan is on, airflow from the fan contacts the air guide and moves the main body into the flapper door opening to close the flapper door opening.

4. The radiator fan assembly of claim 3, wherein the air guide is configured such that airflow from the fan contacting the air guide draws the flapper door towards the fan.

5. The radiator fan assembly of claim 1, wherein flapper door is mounted such that ram air passing through a radiator and the fan, when the fan is off, contacts the main body to rotate the flapper door away from both the radiator and the fan to open the flapper door opening and allow ram air to pass therethrough.

6. The radiator fan assembly of claim 1, wherein the air guide is curved towards a distal end of the flapper door, the distal end is opposite to a proximal end; and
   wherein the flapper door is pivotally mounted to the shroud at the proximal end.

7. The radiator fan assembly of claim 6, wherein the air guide includes an inner curved surface that is opposite to an outer curved surface.

8. The radiator fan assembly of claim 1, wherein the air guide is angled towards a distal end of the flapper door, the distal end is opposite to a proximal end; and
   wherein the flapper door is pivotally mounted to the shroud at the proximal end.

9. The radiator fan assembly of claim 1, wherein the air guide includes a first air guide that defines a first cavity between the first air guide and the main body.

10. The radiator fan assembly of claim 9, wherein the air guide further includes a second air guide that defines a second cavity between the second air guide and the main body.

11. The radiator fan assembly of claim 10, wherein the first air guide is spaced apart from the second air guide.

12. The radiator fan assembly of claim 11, wherein the first air guide defines a first opening facing a distal end of the flapper door, and the second air guide defines a second opening facing the distal end of the flapper door.

13. A radiator fan assembly comprising:
    a radiator;
    a fan arranged to draw airflow through the radiator;
    a shroud defining a fan opening aligned with the fan through which airflow from the fan passes;
    a flapper door opening defined by the shroud; and
    a flapper door pivotally mounted at the flapper door opening such that when no airflow is passing through the flapper door opening a main body of the flapper door is on a side of the shroud that is opposite to the fan, and an air guide extending from main body extends through the flapper door opening;
    wherein:
        the flapper door is mounted such that when the fan is on, airflow from the fan contacts the air guide and moves the main body into the flapper door opening to close the flapper door opening; and
        the flapper door is mounted such that ram air passing through the radiator and the fan contacts the main body to rotate the flapper door away from both the radiator and the fan to open the flapper door opening and allow ram air to pass therethrough.

14. The radiator fan assembly of claim 13, wherein the air guide is curved towards a distal end of the flapper door, the distal end is opposite to a proximal end; and
    wherein the flapper door is pivotally mounted to the shroud at the proximal end.

15. The radiator fan assembly of claim 13, wherein the air guide is angled towards a distal end of the flapper door, the distal end is opposite to a proximal end; and
    wherein the flapper door is pivotally mounted to the shroud at the proximal end.

16. The radiator fan assembly of claim 13, wherein the air guide includes a first air guide that defines a first cavity between the first air guide and the main body.

17. The radiator fan assembly of claim 16, wherein:
the air guide further includes a second air guide that defines a second cavity between the second air guide and the main body, the second air guide is spaced apart from the first air guide.

18. The radiator fan assembly of claim 17, wherein the first air guide defines a first opening of the first cavity that faces a distal end of the flapper door, and the second air guide defines a second opening of a second cavity that faces the distal end of the flapper door.

19. A radiator fan assembly comprising:
a fan;
a shroud defining a fan opening aligned with the fan through which airflow from the fan passes;
a flapper door opening defined by the shroud; and
a flapper door pivotally mounted at the flapper door opening, the flapper door including a main body and an air guide extending from the main body;
wherein the flapper door is mounted at the flapper door opening such that when the fan is on, airflow from the fan contacts the air guide and moves the main body into the flapper door opening to close the flapper door opening.

* * * * *

UNITED STATES PATENT AND TRADEMARK OFFICE
CERTIFICATE OF CORRECTION

PATENT NO. : 10,309,291 B2
APPLICATION NO. : 15/712896
DATED : June 4, 2019
INVENTOR(S) : Thomas Kolpasky Page 1 of 1

It is certified that error appears in the above-identified patent and that said Letters Patent is hereby corrected as shown below:

In the Claims

Column 5, Claim 2, Line 61: after "body", delete "of the"

Signed and Sealed this
Third Day of March, 2020

Andrei Iancu
*Director of the United States Patent and Trademark Office*